United States Patent
Schmitt (10) Patent No.: US 9,049,770 B2
(45) Date of Patent: Jun. 2, 2015

(54) CIRCUIT ARRANGEMENT AND METHOD FOR OPERATING AT LEAST ONE LUMINOUS MEANS

(71) Applicant: OSRAM GmbH, Munich (DE)

(72) Inventor: Harald Schmitt, Munich (DE)

(73) Assignee: Osram GmbH, Munich (DE)

( * ) Notice: Subject to any disclaimer, the term of this patent is extended or adjusted under 35 U.S.C. 154(b) by 0 days.

(21) Appl. No.: 14/187,420

(22) Filed: Feb. 24, 2014

(65) Prior Publication Data

US 2014/0252956 A1    Sep. 11, 2014

(30) Foreign Application Priority Data

Mar. 5, 2013   (DE) .................. 10 2013 203 732

(51) Int. Cl.
*H05B 37/02* (2006.01)
*H05B 33/08* (2006.01)

(52) U.S. Cl.
CPC ................................ *H05B 33/089* (2013.01)

(58) Field of Classification Search
USPC ................... 315/224, 219, 291, 307
See application file for complete search history.

(56) References Cited

U.S. PATENT DOCUMENTS

| | | | |
|---|---|---|---|
| 6,094,014 A | 7/2000 | Bucks et al. | |
| 7,982,452 B2 | 7/2011 | Feldtkeller | |
| 2011/0169424 A1 | 7/2011 | Aboulnaga | |
| 2012/0262082 A1* | 10/2012 | Esaki et al. | 315/224 |
| 2012/0314463 A1 | 12/2012 | Chen | |

FOREIGN PATENT DOCUMENTS

| | | |
|---|---|---|
| DE | 4126544 A1 | 2/1993 |
| DE | 19543720 A1 | 5/1997 |
| DE | 69816958 T2 | 6/2004 |
| DE | 20320319 U1 | 7/2004 |
| DE | 102010038557 A1 | 2/2011 |
| WO | 2009147563 A2 | 12/2009 |
| WO | 2013092662 A1 | 6/2013 |

OTHER PUBLICATIONS

English abstract DE 4126544 A1 of dated Feb. 11, 1993.
English abstract of DE 19543720 A1 dated May 28, 1997.
English abstract of DE 20320319 U1 dated Jun. 9, 2004.
Search Report dated Nov. 6, 2013, issued in the corresponding German application No. 102013203732.5.

* cited by examiner

*Primary Examiner* — David H Vu (57) ABSTRACT

A circuit arrangement may include: an inverter comprising first electronic and second electronic switches coupled in series between a first and second input connections to form a bridge center point; a drive apparatus for the first electronic switch and the second electronic switch; a current-measuring apparatus which is designed and arranged to measure the current through the inverter; a short-circuiting apparatus which is designed to short-circuit the output when the output voltage exceeds a first predefinable threshold value; and an evaluation apparatus which is coupled to the current-measuring apparatus and is designed to determine the mean value of the current through the inverter and, when the mean value undershoots a second predefinable threshold value, to drive the drive apparatus in such a manner that the latter influences the operation of the inverter, by driving the electronic switches in such a manner that the current in the short-circuiting apparatus is reduced.

20 Claims, 4 Drawing Sheets

CIRCUIT ARRANGEMENT AND METHOD FOR OPERATING AT LEAST ONE LUMINOUS MEANS

CROSS-REFERENCE TO RELATED APPLICATION

This application claims priority to German Patent Application Ser. No. 10 2013 203 732.5, which was filed Mar. 5, 2013, and is incorporated herein by reference in its entirety.

TECHNICAL FIELD

Various embodiments relate generally to a circuit arrangement for operating at least one luminous means, including an input having a first input connection and a second input connection for coupling to a DC supply voltage, an inverter including at least one first electronic switch and one second electronic switch which are coupled in series between the first input connection and the second input connection so as to form a bridge center point, an output having a first output connection and a second output connection for providing the at least one luminous means with an output voltage, a drive apparatus for at least the first electronic switch and the second electronic switch, and a current-measuring apparatus which is designed and arranged to measure the current through the inverter. Various embodiments also relate to a corresponding method for operating at least one luminous means.

BACKGROUND

Various embodiments relate to the problem whereby, in operating devices with an SELV (Safety Extra Low Voltage) output, the tangible voltage at the output must not exceed a predefinable voltage, for example 60 V, when there is a fault. This should be ensured by means of appropriate protective circuitry.

The prior art discloses the practice of connecting an appropriate protective apparatus on the secondary side using hardware and of passing an appropriate item of information, by means of optocouplers, to the drive apparatus which then switches off the circuit arrangement. Alternatively, it is known practice to measure the value of the output voltage and to transmit this value to the drive apparatus via an optocoupler, the drive apparatus being designed to cause the circuit arrangement to be switched off when the measured value of the output voltage exceeds a predefinable value.

The disadvantage of these known procedures is the fact that both require an optocoupler. The cost associated with the use of an optocoupler is undesirably high for certain fields of application of such circuit arrangements, in particular if LEDs are used as the luminous means.

SUMMARY

A circuit arrangement may include: an inverter including first electronic and second electronic switches coupled in series between a first and second input connections to form a bridge center point; a drive apparatus for the first electronic switch and the second electronic switch; a current-measuring apparatus which is designed and arranged to measure the current through the inverter; a short-circuiting apparatus which is designed to short-circuit the output when the output voltage exceeds a first predefinable threshold value; and an evaluation apparatus which is coupled to the current-measuring apparatus and is designed to determine the mean value of the current through the inverter and, when the mean value undershoots a second predefinable threshold value, to drive the drive apparatus in such a manner that the latter influences the operation of the inverter, by driving the electronic switches in such a manner that the current in the short-circuiting apparatus is reduced.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments develop a circuit arrangement of the generic type and a method in such a manner that it is possible to provide reliable protection against excessively high voltages at the SELV output without having to resort to the use of an optocoupler.

Various embodiments are based on the knowledge that this can be achieved in a particularly simple and cost-effective manner by means of a two-stage process: the output is first of all short-circuited when the output voltage exceeds a first predefinable threshold value. In any case, this prevents an excessively high voltage being present at the SELV output. This short circuit can then be detected and evaluated on the primary side in order to drive the drive apparatus in any case in such a manner that the latter, by appropriately driving the inverter, influences the operation of the latter in such a manner that the short-circuit current on the secondary side is at least reduced.

In various embodiments, the mean value of the current through the inverter is reduced by means of a short circuit on the secondary side by virtue of the active power component of the current through the inverter falling. Although losses are produced in the short-circuiting apparatus on the secondary side, with the result that a certain active power is transmitted to the secondary side in the event of a short circuit, this is very much lower than during normal operation.

In various embodiments, a fall in the mean value of the current through the inverter in the event of a short circuit to approximately one fifth of the mean value during normal operation was determined. This fall can be easily detected and can be used to appropriately drive the inverter. This not only achieves reliable protection against excessively high voltages at the SELV output but also protects the components of the short-circuiting apparatus from excessively high losses. Since the short circuit on the secondary side is always indirectly detected on the primary side, the use of an expensive optocoupler which is not very stable in the long term can be avoided in this manner. Nevertheless, a very safe and cost-effective solution is provided.

Various embodiments may be distinguished by the fact that, when the mean value undershoots the second predefinable threshold value, the evaluation apparatus is designed to drive the drive apparatus in such a manner that the latter stops operation of the inverter, by accordingly driving at least the first electronic switch and the second electronic switch, or sets the current in the short-circuiting apparatus to a positive value whose amplitude has been reduced, e.g. by changing the frequency of the inverter. Setting a reduced current in the short-circuiting apparatus makes it possible for the circuit arrangement to remain active, and reset periods when switching the arrangement on again can be avoided.

The short-circuiting apparatus may include a breakdown apparatus, e.g. having a functionality of a triac or a thyristor. In this case, it is possible to use actual triacs or thyristors or else corresponding replicas, for example implemented using MOSFETs (metal oxide semiconductor field effect transistors).

The short-circuiting apparatus may include a voltage-limiting apparatus, e.g. a zener diode, a TVS diode, a DIAC or a voltage reference, for example an LM431 module, which can be used to set the first predefinable threshold value, the voltage-limiting apparatus being coupled to the breakdown apparatus in such a manner that the breakdown apparatus breaks down when the output voltage exceeds the first predefinable threshold value. This may prevent the occurrence of impermissibly high voltage values at the SELV output in a particularly reliable manner.

In various embodiments, the evaluation apparatus includes a capacitor and at least one third electronic switch, the capacitor being coupled to the third electronic switch in such a manner that it is turned on if a voltage dropped across the capacitor exceeds a third predefinable threshold value. If the mean value of the current through the inverter is used to charge the capacitor, this makes it possible to detect when the corresponding threshold value is exceeded in a particularly simple manner.

In this context, it may be provided if the evaluation apparatus includes a charging path and a discharging path which are coupled between the current-measuring apparatus and the capacitor, the charging path being designed in such a manner that the voltage dropped along the charging path during operation is lower than the voltage dropped across the discharging path during operation, e.g. by at least a diode voltage. In this manner, the charging current can provide the capacitor with more charge than that removed by the discharging current. In various embodiments, when the difference between the voltage dropped across the charging path and the voltage dropped across the discharging path is at least a diode voltage, this can be used to create a potential which can be used to drive the third electronic switch since its switching threshold also corresponds to a diode voltage.

The charging path may include at least the series circuit including a first diode and a first non-reactive resistor, the discharging path including at least the series circuit including a second diode, a third diode and a second non-reactive resistor. As a result of the fact that the discharging path has a further diode, the abovementioned requirement can be implemented in a particularly simple manner. This may also result in the advantage that the diode path which fluctuates greatly with the temperature occurs both in the third electronic switch and in the first, second and third diodes which generate the offset. If all components are therefore thermally closely coupled, this variation can be reliably compensated for.

Moreover, the first non-reactive resistor may be selected to be larger than the second non-reactive resistor. This may make it possible to carry out fine-tuning. In various embodiments, the first predefinable threshold value and accordingly the third predefinable threshold value can therefore be precisely set.

The capacitor may be coupled between the control electrode and the reference electrode of the third electronic switch, the working electrode of the third electronic switch being coupled to a supply voltage. In this case, it may be advantageous if a third non-reactive resistor or the series circuit including a third non-reactive resistor and a PTC thermistor is coupled between the working electrode of the third electronic switch and the supply voltage. In various embodiments, when the additional PTC thermistor is used, temperature disconnection or temperature revertive control can therefore be carried out using only one additional component.

The working electrode of the third electronic switch may be coupled to the drive apparatus. This already makes it possible to trigger desired driving of the drive apparatus in the event of a short circuit on the secondary side. However, a variant in which the evaluation apparatus also includes a fourth electronic switch whose control electrode is coupled to the working electrode of the third electronic switch, whose reference electrode is coupled to a reference potential and whose working electrode is coupled to the drive apparatus may be provided. The advantage of this implementation over the abovementioned implementation may be that the signal is inverted as a result. This may make it possible to carry out active switching in the event of a fault. Furthermore, the risk of an increased flow of current in the start-up phase of the circuit arrangement can be avoided if the third electronic switch is implemented as a bipolar transistor.

The PTC thermistor is preferably arranged between the control electrode of the fourth electronic switch and the working electrode of the third electronic switch.

The third electronic switch can be in the form of a bipolar transistor and the fourth electronic switch can be in the form of a MOSFET.

A transformer can be coupled between the inverter and the output of the circuit arrangement for the DC isolation of the input of the circuit arrangement from its output. Finally, the circuit arrangement may also includes a rectifier, the secondary side of the transformer being coupled to the input of the rectifier, and the output of the rectifier being coupled to the output of the circuit arrangement. In various embodiments, if LEDs are used as luminous means, this may make it possible to provide the LEDs with a direct current.

Figure 1:
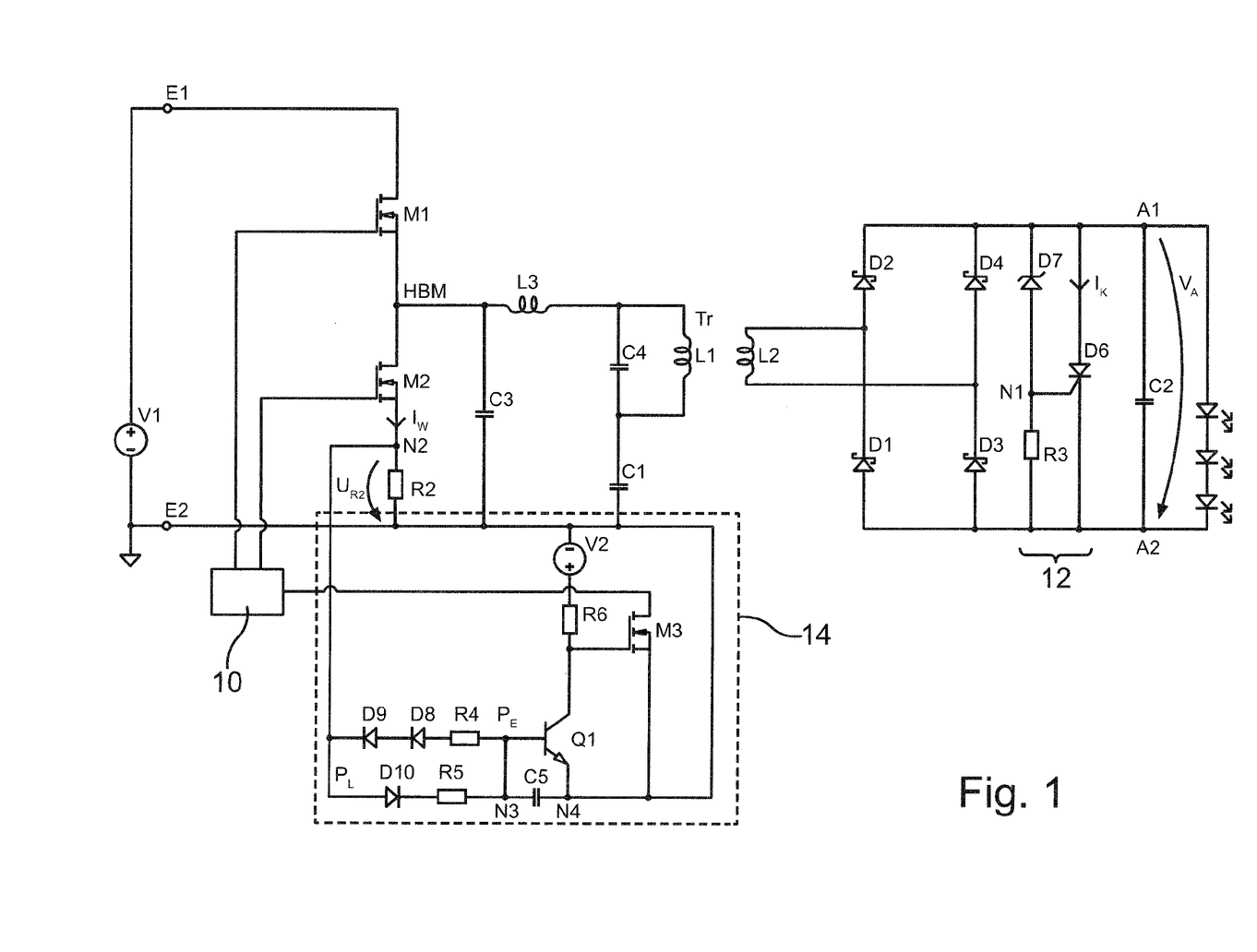
FIG. 1 shows a schematic illustration of a first embodiment of a circuit arrangement.

FIG. 1 shows a schematic illustration of a first embodiment of a circuit arrangement. Said circuit arrangement includes an input having a first input connection E1 and a second input connection E2 for coupling to a DC supply voltage V1. This may represent, for example, a so-called intermediate circuit voltage which has been derived from a power supply AC voltage using a rectifier and a voltage converter. An inverter which, in the present case, is in the form of a half-bridge arrangement is coupled between the input connections E1, E2. This inverter includes a first electronic switch M1 and a second electronic switch M2 which are coupled in series between the first input connection E1 and the second input connection E2 so as to form a half-bridge center point HBM. A shunt resistor R2 which is used to measure the current $I_W$, through the inverter is arranged in series with the switches M1, M2. A drive apparatus 10 is provided for the purpose of driving the switches M1, M2. A switching load-reduction capacitor C3 is coupled in a manner parallel to the series circuit including the switch M2 and the shunt resistor R2. A resonant inductor L3 is also coupled to the half-bridge center point HBM, the other connection of said resonant inductor being coupled, via the parallel circuit including a capacitor C4 and the primary inductance of a transformer Tr and a capacitor C1 arranged in series therewith, to the input connection E2 which, in the present case, is the reference potential of the circuit arrangement. The capacitor C4 is used as a resonant capacitor, while the capacitor C1, as the decoupling capacitor, completes the half-bridge arrangement.

The signal dropped across the secondary inductance L2 of the transformer Tr is supplied to a rectifier which, in the present case, includes the diodes D1 to D4.

The voltage $V_A$ at the output of the rectifier is made available to the at least one luminous means, which, in the present case, is the series circuit including a plurality of LEDs, at the output of the circuit arrangement which includes a first output connection A1 and a second output connection A2. A capacitor C2 which is used to stabilize the output voltage $V_A$ is coupled in a manner parallel to the output.

A short-circuiting apparatus 12 which, in the present case, includes a series circuit including a zener diode D7 and a non-reactive resistor R3 coupled between the output connections A1, A2 is also coupled in a manner parallel to the output A1, A2, the node N1 between the zener diode D7 and the non-reactive resistor R3 being coupled to the starting electrode of a thyristor D6 which is likewise coupled between the output connections A1, A2.

The circuit arrangement also includes an evaluation apparatus 14 which is coupled to the node N2 which is the coupling point between the electronic switch M2 and the shunt resistor R2. As will be explained in yet more detail further below, the evaluation apparatus 14 is used, in various embodiments, to detect when the mean value of the current F undershoots a predefinable threshold value in order to then drive the drive apparatus 10 in such a manner that the current $I_K$ in the short-circuiting apparatus 12 is at least reduced.

A capacitor C5 is provided for this purpose, the connection N3 of which capacitor is coupled to the node N2 via a charging path $P_L$, which includes the series circuit including a diode D10 and a non-reactive resistor R5, and via a discharging path $P_E$ which includes the series circuit including a non-reactive resistor R4 and two diodes D8, D9. Whereas the node N3 is also coupled to the control electrode of an electronic switch Q1, the other connection N4 of the capacitor C5 is coupled to its reference electrode. The working electrode of the switch Q1 is coupled, via a non-reactive resistor R6, to a voltage source V2 which provides a DC voltage of 15 V, for example. It is also coupled to the control electrode of an electronic switch M3 whose reference electrode is coupled to the node N4 and therefore to the input connection E2, that is to say to the reference potential. The working electrode of the switch M3 is coupled to the drive apparatus 10.

With respect to the method of operation: the circuit arrangement according to various embodiments as illustrated in FIG. 1 is used to reliably ensure the conditions which are linked to an SELV output. For example, when LEDs are used as the luminous means, the output voltage $V_A$ must not exceed a value of 60 V at any time. In addition, the output A1, A2 should be safe with respect to a short circuit of the load, with the result that the circuit arrangement is not destroyed in the event of a short circuit.

The circuit arrangement according to various embodiments is designed to ensure, in a first process, that an imminent overvoltage is limited in good time before the absolutely allowed voltage is reached. This is effected by initiating a short circuit on the secondary side with the aid of the short-circuiting apparatus 12. If a threshold voltage predefined by the zener diode D7 is therefore exceeded at the output A1, A2, the thyristor D6 is short-circuited. Instead of a thyristor, it is also possible to use a triac or a thyristor replica.

Since the short-circuiting components are exposed to high current loads in the event of a short circuit, the short-circuit current is reduced, e.g. switched off, according to various embodiments. For this purpose, use is made of the knowledge that only a low active power is consumed both on the secondary side and on the primary side in the event of a short circuit. This substantially results from the power loss of the power components. This low active component is reflected in the current profile of the current through the switches M1, M2 of the inverter: the mean value of the half-bridge current $I_W$ tends almost to zero since the level of the mean value is a measure of the active power. This circumstance is detected with the aid of a shunt resistor R2 at the lower switch M2 of the inverter with subsequent integration of this signal tapped off at the shunt resistor R2 via a resistor—more details of this are given further below—and the capacitor C5.

Since the shunt resistor R2 is intended to be kept as small as possible owing to the power loss produced in it, there is the problem of the signals which are available in absolute terms likewise being very small. For example, the voltage $U_{R2}$ is 10 mV for the short circuit and 250 mV for normal operation. Therefore, this voltage in the event of a short circuit does not suffice to be able to switch a switch, e.g. a bipolar transistor. Therefore, in the present case, the charging resistor of the integrator is not implemented using a simple resistor but rather with an arrangement including the components R4, R5, D8, D9 and D10.

Since the charging path $P_L$ includes one diode less than the discharging path $P_E$, an offset of a diode voltage would be applied to the mean value signal using equivalent resistors R4 and R5. However, in any case, the switch-on voltage of the switch Q1 would therefore be reached since this is likewise a diode voltage, with the result that the switch Q1 would be turned on in all cases, that is to say both in the event of a short circuit and during normal operation. For this reason, the resistor R5 is selected to be larger than the resistor R4, with the result that the offset achieved by the additional diode is somewhat reduced again. In this case, the ratio of R5 to R4 is set in such a manner that the switch Q1 is not turned on in the event of a short circuit, but is during normal operation.

Such an arrangement already makes it possible to drive the drive apparatus and therefore to reduce, e.g. switch off, the short-circuit current in the event of a short circuit on the secondary side. As already mentioned above, a further switch M3 may be provided, the control electrode of which is coupled to the working electrode of the switch Q1. As mentioned, during normal operation, the switch Q1 is turned on, which is why the control electrode of the switch M3 is clamped to the reference potential during normal operation.

As a result, the switch M3 is kept open, that is to say off. If a short circuit now occurs on the secondary side, the switch Q1 is turned off, while the switch M3 is then turned on on account of the fact that its control electrode is coupled to the voltage source V2. This signal can be used, at the working electrode of the switch M3, to accordingly drive the drive apparatus 10, with the result that appropriate driving of the switches of the inverter can be triggered by this operation, which reduces the short-circuit current or switches off the inverter.

This described procedure results in levels which, as described, are sufficient to drive bipolar or MOSFET transistors. It may therefore be possible to dispense with the use of operational amplifiers, thus enabling particularly cost-effective implementation.

The fact that the diode path which greatly fluctuates with the temperature occurs both in the switch Q1 and in the diodes D8 to D10 generating the offset may particularly be advantageous in the embodiment of a circuit arrangement, as illustrated in FIG. 1. If all of these components are therefore thermally closely coupled to one another, this temperature-dependent variation can be reliably compensated for.

Figure 2:
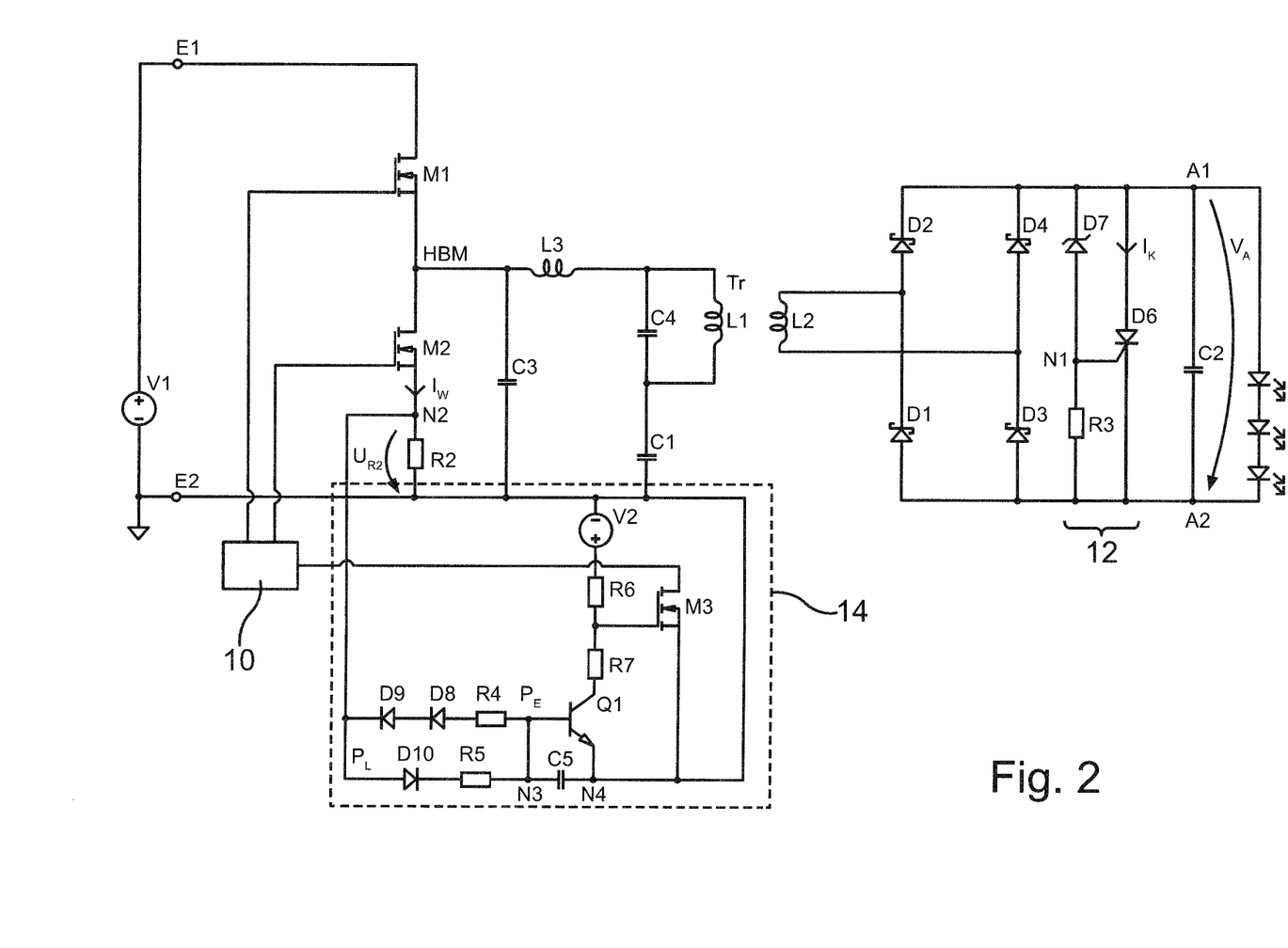
FIG. 2 shows a schematic illustration of a second embodiment of a circuit arrangement.

In the embodiment of a circuit arrangement as illustrated in FIG. 2, in contrast to the embodiment as illustrated in FIG. 1, a PTC thermistor R7 is additionally inserted in series between the working electrode of the switch Q1 and the control electrode of the switch M3. This is a temperature-variable resistor which has a typical resistance of below 1 kΩ in the cold state and has a resistance of considerably more than 10 kΩ above its "switching temperature".

As already mentioned, the switch Q1 is turned on and the switch M3 is turned off during normal operation. If the short circuit occurs, the switch Q1 is turned off, while the switch M3 turns on in a manner driven by the voltage source V2. If the short circuit now does not occur, but rather a different fault condition in the form of an excessively high temperature, this fault can also be detected in the drive apparatus 10 by the embodiment illustrated in FIG. 2 and appropriate driving of the switches M1, M2 of the inverter can then be initiated, for example in order to reduce the power.

This is because, if the PTC thermistor R7 changes to its high-impedance state, the control electrode of the switch M3 is no longer clamped to the reference potential via the switch Q1, but rather is clamped to the voltage source V2. As a result, the switch M3 is turned on, just like in the event of a short circuit. The resistors R6, R7 (cold) and R7 (hot) should be selected in such a manner that, during normal operation, the voltage drop across the resistor R7 is smaller than the switching voltage of the switch M3 and, in the event of an overtemperature or short circuit, is greater than the switching voltage of M3. Temperature disconnection or temperature revertive control can therefore be additionally achieved using only one additional component, namely the PTC thermistor R7.

Figure 3:
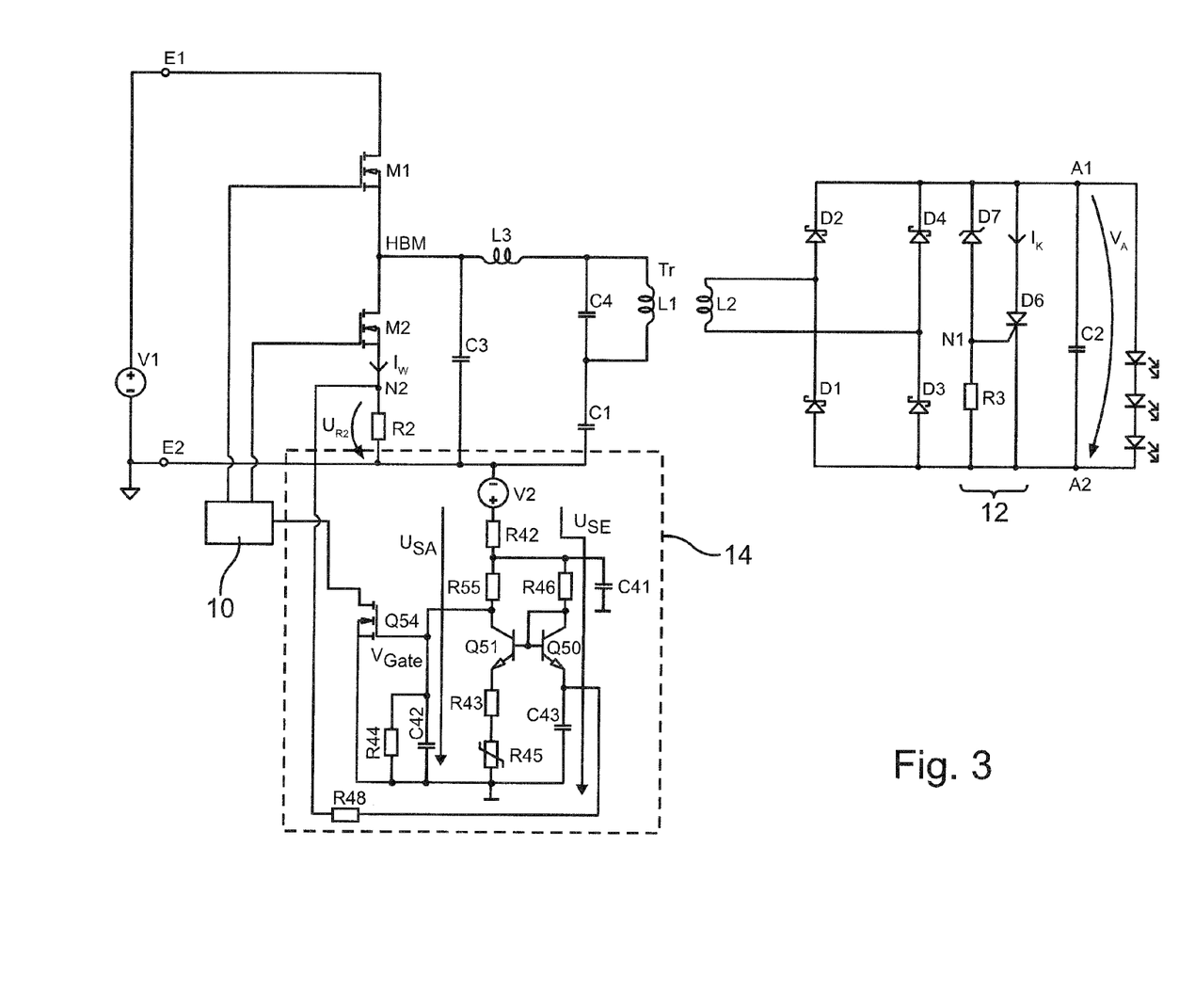
FIG. 3 shows another embodiment of a circuit arrangement.

FIG. 3 shows another embodiment of a circuit arrangement. In this embodiment, the evaluation circuit 14 has an amplifier circuit having two transistors Q50 and Q51 which are connected in the form of a current mirror. Since, as already described above, the shunt resistor R2 is intended to be kept as small as possible owing to the power loss produced in it, there is the problem of the signals which are available in absolute terms likewise being very small. This embodiment may have the advantage that the shunt resistor can be selected to be smaller than in the previous embodiments and the circuit therefore becomes more efficient.

The control electrode of the transistor Q50 is coupled to the working electrode of the transistor Q50 and to the control electrode of the transistor Q51. The measuring current from the node N2 is coupled to a pole of the capacitor C43 via a resistor R48, this pole of the capacitor C43 being coupled to the reference electrode of the transistor Q50. This is the input of the amplifier circuit. The reference electrode of the transistor Q51 is coupled to a series circuit including a resistor R43 and a resistor R45. The working electrode of the transistor Q50 is coupled to a resistor R46, and the working electrode of the transistor Q51 is coupled to a resistor R55. The coupling point between the working electrode of the transistor Q51 and the resistor R55 is the output of the amplifier circuit. The other poles of the two resistors R46 and R55 are coupled to a resistor R42 whose other pole is in turn coupled to the voltage source V2.

The coupling point between the resistor R55 and the working electrode of the transistor Q51 is coupled to the control electrode of a transistor Q54. The working electrode of the transistor Q54 is coupled to the drive apparatus 10.

The capacitor is charged to a voltage $U_{C43}$ via the resistor R48. As a result of the connection of the two transistors Q50 and Q51, the voltage at the reference electrode of the transistor Q51 must be just as large as the voltage $U_{C43}$ at the capacitor C43. On account of the connection of the components, the voltages $V_{SE}$ and $V_{SA}$ are the same. The voltage $V_{SE}$ is formed by the voltage across the resistor R46, the voltage across the transistor Q50 and the voltage $U_{C43}$ of the capacitor C43. The voltage $V_{SA}$ is formed by the voltage across the resistor R55, the voltage across the transistor Q51, the voltage across the resistor R43 and the voltage across the resistor R45 which is in the form of a PTC. The node between the working electrode of the transistor Q51 and the resistor R55 is denoted $V_{Gate}$ and is connected to the control electrode of the transistor Q54. A resistor R44 and a capacitor C42 are connected between the control electrode and the reference electrode of the transistor Q54.

The transistor Q54 may be a MOSFET, and the transistors Q50 and Q51 may be bipolar transistors. Since the two transistors Q50 and Q51 are connected in the form of a current mirror, good temperature compensation of the circuit is ensured if the two transistors have the same design. In various embodiments, both transistors are accommodated on the same die and share a housing. Such transistors are also known as double transistors.

With respect to the method of operation:

As long as the circuit is operating normally, a comparatively large signal is applied to the resistor R2 since, as already described above, a large amount of power is consumed in the load. This signal results in a comparatively high voltage at the capacitor C43. On account of the special characteristics of the circuit, this voltage is transmitted to the output side and is applied to the series circuit including the resistors R43 and R45. As a result of the fact that the voltage at the series circuit including the resistor R43 and the resistor R45 is very high, a comparatively high current also flows through the path along VSA. The fact that the series circuit including the resistor R43 and the resistor R45 is considerably smaller than the resistor R55 results in the point $V_{Gate}$ being very close to the reference potential of the evaluation circuit 14. The MOSFET Q54 is switched off as a result. The resistance of the collector-emitter path across the transistor Q51 is likewise very small on account of the high current.

In the event of a fault, the thyristor D6 is short-circuited, as described above, and the consumed power of the circuit is significantly lower than normal. As a result, the mean value of the half-bridge current $I_W$ also tends virtually to zero and the signal at the resistor R2 therefore becomes very small, which results in a considerably lower voltage at the capacitor C43. As a result, the voltage at the series circuit including the resistor R43 and the resistor R45 is also accordingly low, which results in a much lower current through the path along VSA. Owing to the lower current, the voltages at the resistors R43, R45 and R55 are considerably smaller. Since the total voltage VSA must still be just as high, however, owing to the voltage source V2, the difference is offset by the transistor Q51. That is to say, a considerably higher voltage than during normal operation is applied to the collector-emitter path of the transistor Q51. This circumstance results in a considerably higher potential at the point $V_{Gate}$, as a result of which the MOSFET Q54 switches on and reports the fault to the drive apparatus 10. The threshold value of the capacitor voltage $U_{C43}$, from which the transistor Q54 switches, can be adjusted by dimensioning the resistors R55 and R43/R45.

Figure 4:
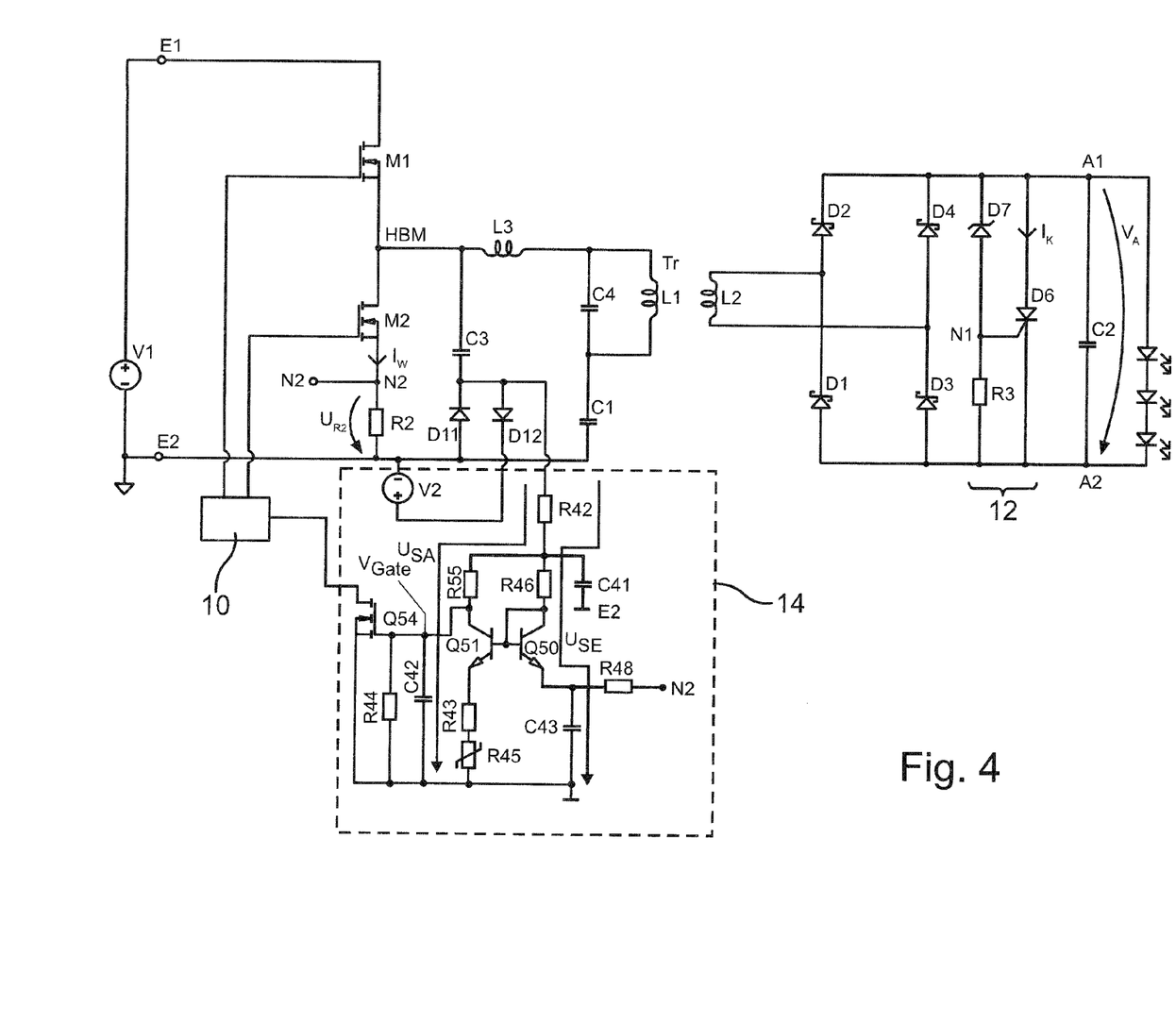
FIG. 4 shows another embodiment of a circuit arrangement.

The circuit arrangement in FIG. 4 is similar to the circuit arrangement in FIG. 3 and therefore only the differences from the circuit arrangement according to FIG. 3 are described.

The evaluation circuit 14 in FIG. 4 corresponds to the evaluation circuit 14 in FIG. 3; only the voltage source V2 is connected differently. The embodiment according to FIG. 4 solves the problem that unpredictable states which result in premature disconnection of the half-bridge and therefore of the converter may occur when starting up the circuit. This problem is known, in various embodiments, with respect to auxiliary voltage supplies such as V2

When starting up the circuit, the auxiliary voltage is usually generated via a resistor which charges a capacitor. Since such a voltage source has a very high impedance, voltage dips which result in unpredictable states of the circuit may occur here. In this embodiment, the voltage source V2 is therefore routed via two diodes D11 and D12. In this case, the positive output of the voltage source V2 is coupled to the cathode of the diode D12. The anode of the diode D12 is coupled to a connection of the capacitor C3 and to the cathode of the diode D11. The anode of the diode D11 is coupled to the reference potential of the half-bridge. As a result of this measure, the voltage source is no longer used to supply the evaluation circuit 14. The evaluation circuit 14 is supplied via the switching load-reduction capacitor C3 only when the half-bridge is running. Depending on the switching state of the half-bridge, said switching load-reduction capacitor has a voltage between the reference potential of the half-bridge and the maximum voltage of the voltage source V2 since higher voltages flow away into the voltage source V2 via the diode D12. As a result of the voltage at the capacitor C3, a current flows via the resistor R42 and charges the capacitor C41 which is used to supply the current mirror. The size of the resistor R42 and of the storage capacitor C41 must be adapted to the current requirements of the evaluation circuit 14.

With this measure, the evaluation circuit 14 is supplied with operating voltage only when the half-bridge is operating and the voltage from the voltage source V2 is therefore stable and the supply voltage for the evaluation circuit 14 is guaranteed.

In various embodiments, a circuit arrangement for operating at least one luminous means is provided. The circuit arrangement may include an input having a first input connection and a second input connection for coupling to a DC supply voltage; an inverter including at least one first electronic switch and one second electronic switch which are coupled in series between the first input connection and the second input connection so as to form a bridge center point; an output having a first output connection and a second output connection for providing the at least one luminous means with an output voltage; a drive apparatus for at least the first electronic switch and the second electronic switch; a current-measuring apparatus which is designed and arranged to measure the current through the inverter; a short-circuiting apparatus which is coupled in a manner parallel to the output and is designed to short-circuit the output when the output voltage exceeds a first predefinable threshold value; and an evaluation apparatus which is coupled to the current-measuring apparatus and is designed to determine the mean value of the current through the inverter and, when the mean value undershoots a second predefinable threshold value, to drive the drive apparatus in such a manner that the latter influences the operation of the inverter, by accordingly driving at least the first electronic switch and the second electronic switch, in such a manner that the current in the short-circuiting apparatus is at least reduced.

In various embodiments, when the mean value undershoots the second predefinable threshold value, the evaluation apparatus is designed to drive the drive apparatus in such a manner that the latter stops operation of the inverter, by accordingly driving at least the first electronic switch and the second electronic switch, or sets the current in the short-circuiting apparatus to a positive value whose amplitude has been reduced. In various embodiments, when the mean value undershoots the second predefinable threshold value, the evaluation apparatus is designed to drive the drive apparatus in such a manner that the latter stops operation of the inverter, by accordingly driving at least the first electronic switch and the second electronic switch, or sets the current in the short-circuiting apparatus to a positive value whose amplitude has been reduced by changing the frequency of the inverter. In various embodiments, the short-circuiting apparatus includes a breakdown apparatus. In various embodiments, the breakdown apparatus has a functionality of a triac or a thyristor. In various embodiments, the short-circuiting apparatus includes a voltage-limiting apparatus, which can be used to set the first predefinable threshold value, the voltage-limiting apparatus being coupled to the breakdown apparatus in such a manner that the breakdown apparatus breaks down when the output voltage exceeds the first predefinable threshold value. In various embodiments, the short-circuiting apparatus includes a voltage-limiting apparatus selected from a group consisting of: a zener diode; a TVS diode; a DIAC; and a voltage reference. In various embodiments, the evaluation apparatus includes a first capacitor and at least one third electronic switch, the first capacitor being coupled to the third electronic switch in such a manner that it is turned on if a voltage dropped across the first capacitor exceeds a third predefinable threshold value. In various embodiments, the evaluation apparatus includes a charging path and a discharging path which are coupled between the current-measuring apparatus and the first capacitor, the charging path being designed in such a manner that the voltage dropped along the charging path during operation is lower than the voltage dropped across the discharging path during operation. In various embodiments, the evaluation apparatus includes a charging path and a discharging path which are coupled between the current-measuring apparatus and the first capacitor, the charging path being designed in such a manner that the voltage dropped along the charging path during operation is lower than the voltage dropped across the discharging path during operation by at least a diode voltage. In various embodiments, the charging path includes at least the series circuit including a first diode and a first non-reactive resistor, the discharging path including at least the series circuit including a second diode, a third diode and a second non-reactive resistor. In various embodiments, the first non-reactive resistor is larger than the second non-reactive resistor. In various embodiments, the capacitor is coupled between the control electrode and the reference electrode of the third electronic switch, the working electrode of the third electronic switch being coupled to a supply voltage. In various embodiments, a third non-reactive resistor or the series circuit including a third non-reactive resistor and a first PTC thermistor is coupled between the working electrode of the third electronic switch and the supply voltage. In various embodiments, the working electrode of the third electronic switch is coupled to the drive apparatus. In various embodiments, the evaluation apparatus also includes a fourth electronic switch whose control electrode is coupled to the working electrode of the third electronic switch, whose reference electrode is coupled to a reference potential and whose working electrode is coupled to the drive apparatus. In various embodiments, the first PTC thermistor is arranged between the control electrode of the fourth electronic switch and the working electrode of the third electronic switch. In various embodiments, the third electronic switch is in the form of a bipolar transistor and the fourth electronic switch is in the form of a MOSFET. In various embodiments, a transformer is coupled between the inverter and the output of the circuit arrangement for the DC isolation of the input of the circuit arrangement from its output. In various embodiments, the circuit arrangement further includes a rectifier, the secondary side of the transformer being coupled to the input of the rectifier, and the output of the rectifier being coupled to the output of the circuit arrangement. In various embodiments, the evaluation apparatus includes: an amplifier circuit having a fourth electronic switch and a fifth electronic switch, a second capacitor which is charged via a charging path and is coupled to the input of the amplifier circuit, and a sixth electronic switch, the amplifier circuit setting, at its output, a voltage which is proportional to the voltage across the second capacitor, and the sixth electronic switch being switched on the basis of a predefinable third threshold value of the voltage across the second capacitor in order to indicate that the mean value of the current through the inverter undershoots a second predefinable threshold value, and the sixth electronic switch driving the drive apparatus in such a manner that it influences the operation of the inverter, by accordingly driving at least the first electronic switch and the second electronic switch, in such a manner that the current in the short-circuiting apparatus is at least reduced. In various embodiments, the fourth switch and the fifth switch are bipolar transistors and are connected as current mirrors. In various embodiments, the input side of the amplifier circuit has circuitry consisting of a series circuit including a fourth non-reactive resistor, the path between the working electrode and the reference electrode of the fourth transistor and the second capacitor. In various embodiments, the output side of the amplifier circuit has a series circuit including a fifth non-reactive resistor, the path between the working electrode and the reference electrode of the fifth transistor and a sixth non-reactive resistor and a second PTC thermistor. In various embodiments, the resistance value of the series circuit including the sixth non-reactive resistor and the second PTC thermistor is smaller than the value of the fifth non-reactive resistor. In various embodiments, the control electrode of the sixth electronic switch is coupled to the connection point between the fifth non-reactive resistor and the working electrode of the fifth transistor, and the working electrode is coupled to the drive apparatus.

In various embodiments, a method for operating at least one luminous means using a circuit arrangement which includes an input having a first input connection and a second input connection for coupling to a DC supply voltage; an inverter which includes at least one first electronic switch and one second electronic switch which are coupled in series between the first input connection and the second input connection so as to form a bridge center point; an output having a first output connection and a second output connection for providing the at least one luminous means with an output voltage; a drive apparatus for at least the first electronic switch and the second electronic switch; and a current-measuring apparatus which is designed and arranged to measure the current through the inverter, is provided. The method may include: short-circuiting the output when the output voltage exceeds a first predefinable threshold value; determining the mean value of the current through the inverter; and if the mean value undershoots a second predefinable threshold value: driving the drive apparatus in such a manner that it influences the operation of the inverter, by accordingly driving at least the first electronic switch and the second electronic switch, in such a manner that the current in the short-circuiting apparatus is at least reduced.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuit arrangement for operating at least one luminous means, the circuit arrangement comprising: an input having a first input connection and a second input connection for coupling to a DC supply voltage; an inverter comprising at least one first electronic switch and one second electronic switch which are coupled in series between the first input connection and the second input connection so as to form a bridge center point; an output having a first output connection and a second output connection for providing the at least one luminous means with an output voltage; a drive apparatus for at least the first electronic switch and the second electronic switch; a current-measuring apparatus which is designed and arranged to measure the current through the inverter; a short-circuiting apparatus which is coupled in a manner parallel to the output and is designed to short-circuit the output when the output voltage exceeds a first predefinable threshold value; and an evaluation apparatus which is coupled to the current-measuring apparatus and is designed to determine the mean value of the current through the inverter and, when the mean value undershoots a second predefinable threshold value, to drive the drive apparatus in such a manner that the latter influences the operation of the inverter, by accordingly driving at least the first electronic switch and the second electronic switch, in such a manner that the current in the short-circuiting apparatus is at least reduced.

2. The circuit arrangement of claim 1, wherein when the mean value undershoots the second predefinable threshold value, the evaluation apparatus is designed to drive the drive apparatus in such a manner that the latter stops operation of the inverter, by accordingly driving at least the first electronic switch and the second electronic switch, or sets the current in the short-circuiting apparatus to a positive value whose amplitude has been reduced.

3. The circuit arrangement of claim 2, wherein when the mean value undershoots the second predefinable threshold value, the evaluation apparatus is designed to drive the drive apparatus in such a manner that the latter stops operation of the inverter, by accordingly driving at least the first electronic switch and the second electronic switch, or sets the current in the short-circuiting apparatus to a positive value whose amplitude has been reduced by changing the frequency of the inverter.

4. The circuit arrangement of claim 1, wherein the short-circuiting apparatus comprises a breakdown apparatus.

5. The circuit arrangement of claim 4, wherein the short-circuiting apparatus comprises a voltage-limiting apparatus, which can be used to set the first predefinable threshold value, the voltage-limiting apparatus being coupled to the breakdown apparatus in such a manner that the breakdown apparatus breaks down when the output voltage exceeds the first predefinable threshold value.

6. The circuit arrangement of claim 1, wherein the evaluation apparatus comprises a first capacitor and at least one third electronic switch, the first capacitor being coupled to the third electronic switch in such a manner that it is turned on if a voltage dropped across the first capacitor exceeds a third predefinable threshold value.

7. The circuit arrangement of claim 6, wherein the evaluation apparatus comprises a charging path and a discharging path which are coupled between the current-measuring apparatus and the first capacitor, the charging path being designed in such a manner that the voltage dropped along the charging path during operation is lower than the voltage dropped across the discharging path during operation.

8. The circuit arrangement of claim 7, wherein the charging path comprises at least the series circuit comprising a first diode and a first non-reactive resistor, the discharging path comprising at least the series circuit comprising a second diode, a third diode and a second non-reactive resistor.

9. The circuit arrangement of claim 8, wherein the first non-reactive resistor is larger than the second non-reactive resistor.

10. The circuit arrangement of claim 6, wherein the capacitor is coupled between the control electrode and the reference electrode of the third electronic switch, the working electrode of the third electronic switch being coupled to a supply voltage.

11. The circuit arrangement of claim 10, wherein a third non-reactive resistor or the series circuit comprising a third non-reactive resistor and a first PTC thermistor is coupled between the working electrode of the third electronic switch and the supply voltage.

12. The circuit arrangement of claim 11, wherein the evaluation apparatus also comprises a fourth electronic switch whose control electrode is coupled to the working electrode of the third electronic switch, whose reference electrode is coupled to a reference potential and whose working electrode is coupled to the drive apparatus.

13. The circuit arrangement of claim 12, wherein the first PTC thermistor is arranged between the control electrode of the fourth electronic switch and the working electrode of the third electronic switch.

14. The circuit arrangement of claim 6, wherein the third electronic switch is in the form of a bipolar transistor and the fourth electronic switch is in the form of a MOSFET.

15. The circuit arrangement of claim 1, wherein a transformer is coupled between the inverter and the output of the circuit arrangement for the DC isolation of the input of the circuit arrangement from its output.

16. The circuit arrangement of claim 1, wherein the evaluation apparatus comprises: an amplifier circuit having a fifth electronic switch and a sixth electronic switch, a second capacitor which is charged via a charging path and is coupled to the input of the amplifier circuit, and a seventh electronic switch, the amplifier circuit setting, at its output, a voltage which is proportional to the voltage across the second capacitor, and the seventh electronic switch being switched on the basis of a predefinable third threshold value of the voltage across the second capacitor in order to indicate that the mean value of the current through the inverter undershoots a second predefinable threshold value, and the seventh electronic switch driving the drive apparatus in such a manner that it influences the operation of the inverter, by accordingly driving at least the first electronic switch and the second electronic switch, in such a manner that the current in the short-circuiting apparatus is at least reduced.

17. The circuit arrangement of claim 16, wherein the fourth switch and the fifth switch are bipolar transistors and are connected as current mirrors.

18. The circuit arrangement of claim 17, wherein the output side of the amplifier circuit has a series circuit comprising a fifth non-reactive resistor, the path between the working electrode and the reference electrode of the fifth transistor and a sixth non-reactive resistor and a second PTC thermistor.

19. The circuit arrangement of claim 18, wherein the control electrode of the seventh electronic switch is coupled to the connection point between the fifth non-reactive resistor and the working electrode of the fifth sixth transistor, and the working electrode is coupled to the drive apparatus.

20. A method for operating at least one luminous means using a circuit arrangement which comprises an input having a first input connection and a second input connection for coupling to a DC supply voltage; an inverter which comprises at least one first electronic switch and one second electronic switch which are coupled in series between the first input connection and the second input connection so as to form a bridge center point; an output having a first output connection and a second output connection for providing the at least one luminous means with an output voltage; a drive apparatus for at least the first electronic switch and the second electronic switch; and a current-measuring apparatus which is designed and arranged to measure the current through the inverter; the method comprising: short-circuiting the output when the output voltage exceeds a first predefinable threshold value; determining the mean value of the current through the inverter; and if the mean value undershoots a second predefinable threshold value: driving the drive apparatus in such a manner that it influences the operation of the inverter, by accordingly driving at least the first electronic switch and the second electronic switch, in such a manner that the current in the short-circuiting apparatus is at least reduced.

* * * * *